United States Patent [19]

Malavieille

[11] Patent Number: 4,629,284
[45] Date of Patent: Dec. 16, 1986

[54] METHOD AND APPARATUS FOR CONNECTING OPTICAL FIBERS

[75] Inventor: François-Louis Malavieille, Paris, France

[73] Assignee: Alliance Technique Industrielle, Evry, France

[21] Appl. No.: 586,748

[22] Filed: Mar. 6, 1984

[30] Foreign Application Priority Data

Mar. 11, 1983 [FR] France ................................ 83 04082
Apr. 20, 1983 [FR] France ................................ 83 06499

[51] Int. Cl.⁴ .............................................. G02B 6/38
[52] U.S. Cl. .............................. 350/96.21; 350/96.15
[58] Field of Search ............... 350/96.20, 96.21, 96.22, 350/96.15

[56] References Cited

U.S. PATENT DOCUMENTS

| | | | |
|---|---|---|---|
| 4,046,454 | 9/1977 | Pugh, III | 350/96.21 |
| 4,088,386 | 5/1978 | Hawk | 350/96.21 |
| 4,102,561 | 7/1978 | Hawk et al. | 350/96.21 |
| 4,103,987 | 8/1978 | Kersten | 350/96.21 |
| 4,172,746 | 10/1979 | Le Noane et al. | 350/96.21 X |
| 4,186,997 | 2/1980 | Schumacher | 350/96.21 |
| 4,257,674 | 3/1981 | Griffin et al. | 350/96.21 |
| 4,302,267 | 11/1981 | Palmer et al. | 350/96.15 X |
| 4,385,801 | 5/1983 | Bubanko | 350/96.21 |

FOREIGN PATENT DOCUMENTS

| | | | |
|---|---|---|---|
| 2611658 | 9/1977 | Fed. Rep. of Germany | 350/96.21 |
| 53-010445 | 1/1978 | Japan | 350/96.21 |
| 54-034251 | 3/1979 | Japan | 350/96.22 |
| 54-106246 | 8/1979 | Japan | 350/96.21 |
| 58-004110 | 1/1983 | Japan | 350/96.21 |

Primary Examiner—John Lee
Attorney, Agent, or Firm—Dennison, Meserole, Pollack & Scheiner

[57] ABSTRACT

The apparatus comprises: firstly a support (4) having at least one surface (40) which is made of soft, elastically deformable material and which includes a groove (5) suitable for receiving the ends of two optical fibers (1, 2) to be connected in end-to-end contact; and secondly a member (8) which is kept bearing against the support surface and the ends of the optical fibers. Said member (8) comprises a polished rigid part such that keeping it bearing against the support surface (40) exerts a compression action on the said ends of the fibers, giving rise to radial reaction from the wall of the groove against the ends of the fibers, and thus ensuring that the fibers are aligned.

34 Claims, 23 Drawing Figures

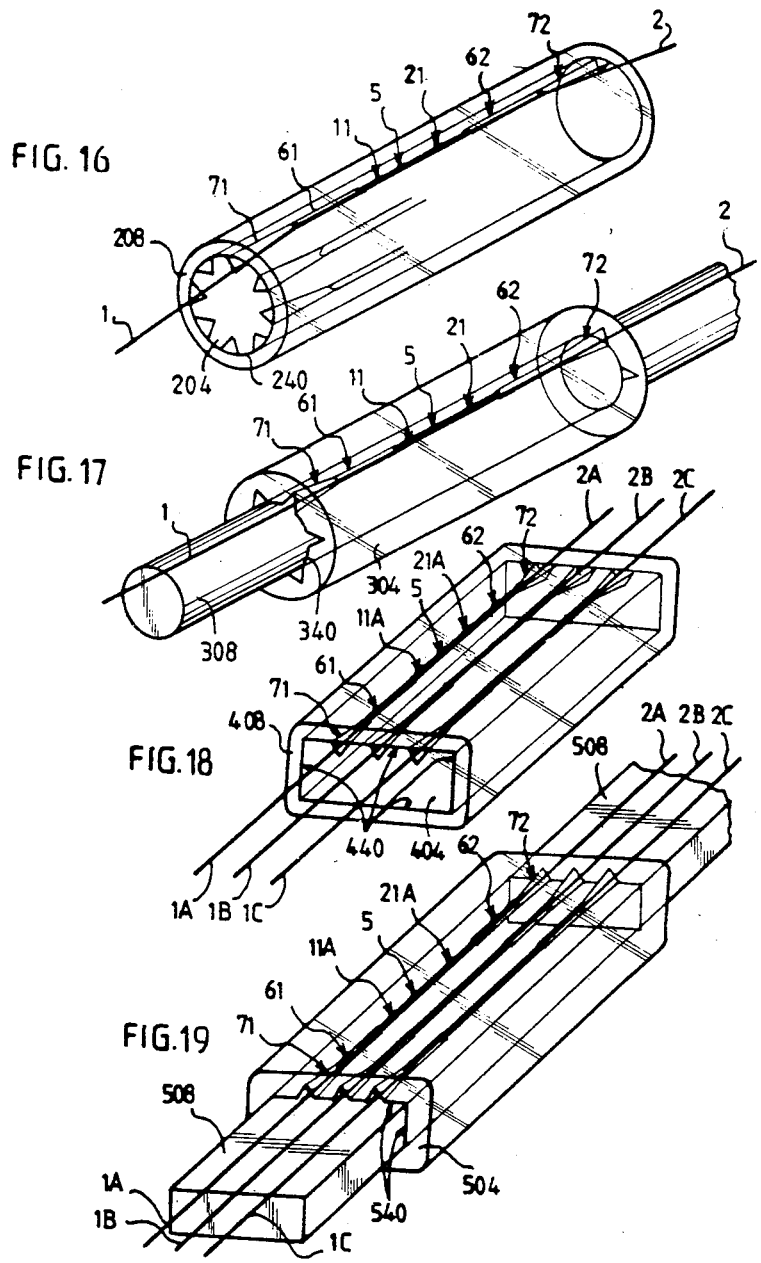

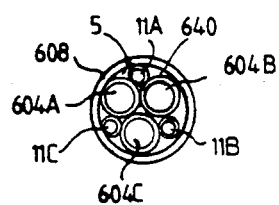
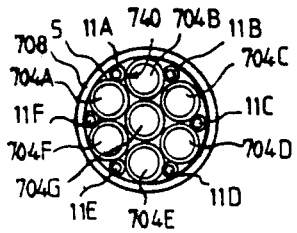
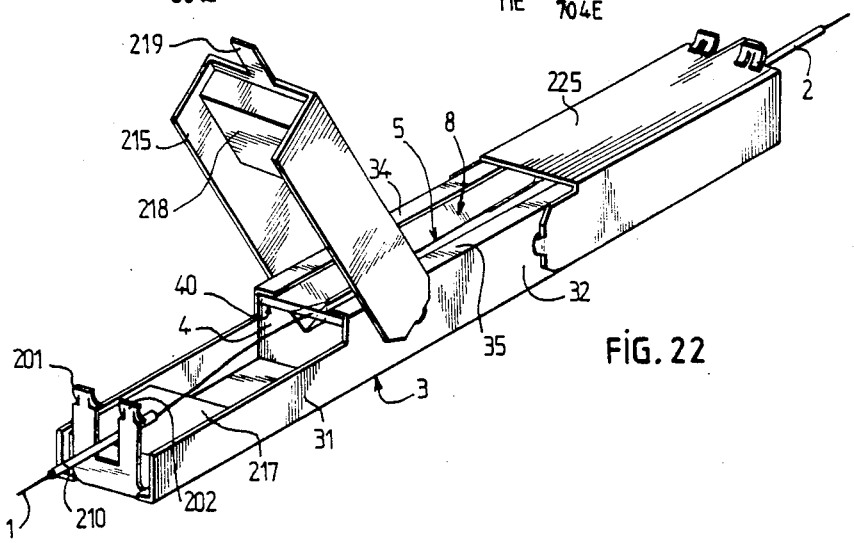
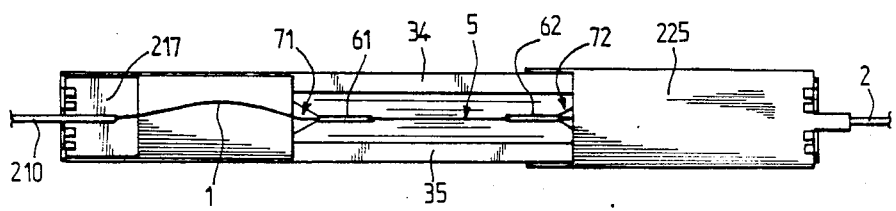

METHOD AND APPARATUS FOR CONNECTING OPTICAL FIBERS

The invention relates to connecting optical fibers.

BACKGROUND OF THE INVENTION

Optical fiber connectors already exist for connecting optical fibers. They comprise two plugs into which the fibers to be connected are slid, and a third member or connection part which is interposed between the plugs and which enables continuity to be obtained in the light guide. An essential characteristic of optical fiber connectors is that they are intended to be assembled and disassembled at will by the user. This essential practical advantage is obtained at the cost of non-negligible technical complexity, as is well known to the person skilled in the art.

The present invention relates to apparatus of a different type which is not intended to provide a connection between optical fibers which can be released at will, but rather it is intended to provide a stable connection which may be modified from time to time as required. By analogy with electricity, the present invention may be considered to provide a kind of optical fiber connection strip, whereas the above-mentioned connectors correspond in contrast to the various families of releasable connectors.

In this respect, preferred embodiments of the present invention provide connection means which are cheaper and easier to use than such connectors, and which are particularly applicable for installing complete distribution networks using optical fibers, for example. In such a network, multi-fiber cables need to be connected or to be divided in cabinets or chests for making junctions or branch connections, thereby enabling the network operator to set up and subsequently to modify connections to various subscribers.

It may be observed that an optical fiber connector can also perform this function. However, a connector suffers from the technical complexity already mentioned, which naturally leads to greater cost. Further, optical fiber connectors include two parts which are permanently fixed to each of the fibers to be connected thereby.

Similarly, it is often useful in a laboratory to have simple, fast and effective means for making fiber-to-fiber connections, where fitting a complete connector would be slow, expensive and not removable from each of the fiber ends concerned, as mentioned above.

In this context, preferred embodiments of the invention also solve the tricky problems of connecting fibers end-to-end in a simple manner, which problems are essentially due to the very small size and to the fragility of the fibers. The present trend is for the central or "core" part optical fibers to be made to even smaller diameters.

Another difficulty which preferred embodiments of the present invention solve is related to the fact that the fibers to be connected may have slightly different diameters due to manufacturing tolerances, to coming from different suppliers, of just to coming from different batches. Connections should be of substantially constant quality in spite of such variations.

SUMMARY OF THE INVENTION

In a first aspect the present invention provides a method of connecting optical fibers, the method including a preparatory step of:

(a) preparing the ends of at least two optical fibers for connection;

and comprising the improvement of the following step in which:

(b) the ends of at least two fibers to be connected are inserted end-to-end in a groove provided in the surface of a support which, at least at said surface, is made of a material that is softer than the fibers and which is elastically deformable; and the fibers are lightly urged against one another to ensure intimate contact between their end faces; at the same time a polished rigid member is maintained bearing against said support surface thereby applying pressure to said fibers giving rise to radial reaction from the wall of the groove against the fibers and thus ensuring that the fibers are in alignment.

The fibers may be prepared using known techniques for this purpose. In particular, plane end faces perpendicular to the axis of the fibers and of the shiny mirror type are preferably obtained by the method described in the applicants' French patent application No. 78 09703 (published under the number 2 422 604). This prior patent application describes apparatus for sectioning optical fibers, in which fiber end faces suitable for connection are obtained by cleaving the fibers. Then, it is currently considered to be advantageous to strip the covering from the end of each of the fibers.

Step b is preferably performed as follows:

(b1) the end face of a first one of the fibers is brought to substantially half way along the groove;

(b2) the first fiber is fixed relative to the support;

(b3) the end face of the second fiber is brought into contact inside the groove with the end face of the first fiber; and (b4) the second fiber is also fixed relative to the support, at the opposite side thereof.

In a second aspect the present invention also provides apparatus for connecting optical fibers by implementing the above method.

The apparatus includes parts which are in common with prior known apparatuses: it comprises firstly a support having at least one surface which is made of soft, elastically deformable material and which includes a groove suitable for receiving the ends of two optical fibers to be connected in end-to-end contact, and secondly a member which is kept bearing against the support surface and the ends of the optical fibers. Similar arrangements are described, for example, is U.S. Pat. Nos. 4,088,386, 4,102,561, and 4,257,674.

However, in these prior documents, the member kept bearing against the support surface is always another body of soft material, possibly having grooves, and the elastic properties of both parts placed on either side of the optical fibers is thus used in these prior documents for axially wedging the fibers, and thus for ensuring their alignment.

The apparatus in accordance with the present invention uses a combination of different means.

The apparatus comprises the above-defined means, i.e. firstly a support having at least one surface which is made of soft, elastically deformable material and which includes a groove suitable for receiving the ends of two optical fibers to be connected in end-to-end contact, which ends preferably include plane end faces perpendicular to the fiber axis and having a shiny mirror type of surface, and secondly a member which is kept bearing against the support surface and the ends of the optical fibers.

In accordance with the second aspect of the present invention, said member comprises a polished rigid part such that keeping it bearing against the said support surface exerts a compression action on the said ends of the fibers, giving rise to radial reaction from the wall of the groove against the ends of the fibers, and thus ensuring that the fibers are aligned.

Thus, the present invention goes against the teaching of the prior documents, in which the both parts between which the optical fibers are clamped are deformable.

In contrast, the present invention takes advantage of the excellent surface state of the polished rigid part, and uses this in co-operation with a block of soft, elastically deformable material to provide a connection between two optical fibers, or as is explained below, between two sets of optical fibers.

According to a particularly advantageous implementation of the present invention, the said polished rigid member is a transparent plate, preferably a plate of glass which is thick enough to ensure that it is rigid.

The apparatus preferably includes two clamps, one at each end of the support, for fixing the fibers relative to the support. The clamps are used in such a manner as to ensure that the fibers are urged towards each other. The permanent axial thrust thus exerted on the fibers ensures that close contact is maintained over time between the end faces of the fibers in the groove.

In a multiple connection embodiment, the apparatus comprises a plurality of grooves whose axes are preferably substantially parallel, thereby enabling fibers in two different sets of fibers to be connected end-to-end in pairs. Two multi-fiber cables can thus be interconnected, fiber-to-fiber, or a single multi-fiber cable can be connected to a plurality of single fiber cables.

The Applicant has further observed that the polished portion of the rigid plate or member need not necessarily be plane, and on the contrary it may be curved in shape relative to the axis of the groove or grooves. Preferably, the polished portion of the rigid member has a closed right cross section, which may be circular or substantially circular, or else it may be polygonal or substantially polygonal.

In an advantageous embodiment, the polished portion of the rigid plate and the groove-carrying surface are two geometrically similar surfaces, which are quasi complementary and which overlap slightly in the rest position such that placing one against the other requires thrust to be exerted.

More generally, the groove-carrying surface and the polished portion of the rigid plate may be a pair of homologous and/or tangential surfaces suitable for exerting said bearing force against one another by co-operation of their respective shapes. The elastic portion may in particular be made in several parts such that its outer contour or envelope defines the groove-carrying surface.

In a first family of embodiments, the elastic portion is inside and the rigid member is outside.

In a second family of embodiments the elastic portion is outside and the rigid member is inside. In this case, the rigid member may be provided with a central channel which is advantageous in some applications.

BRIEF DESCRIPTION OF THE DRAWINGS

Embodiments and of the invention are described by way of example, with reference to the accompanying drawings, in which:

FIG. 16 is a perspective view of apparatus in accordance with the invention of circular cross section and with the rigid member on the outside;

FIG. 17 is a perspective view of apparatus in accordance with the invention of circular cross section and with the rigid member on the inside;

FIG. 18 is a perspective view of apparatus in accordance with the invention having a closed polygonal cross section with the rigid member on the outside;

FIG. 19 is a perspective view of apparatus in accordance with the invention having a closed polygonal cross section with the rigid member on the inside;

FIGS. 20 and 21 are cross section views through apparatuses comparable to the FIG. 16 apparatus, but in which the support of soft material is made of up from a plurality of parts;

FIG. 22 is a perspective view of a variant apparatus in accordance with the invention, this apparatus being fitted with means that make it particularly simple to set up the required axial thrust on the optical fibers, one of the apparatus is shown open while the other end is shown closed; and FIG. 23 is a plan view of the FIG. 22 apparatus, with the end that is shown open in FIG. 22 being shown dismantled in FIG. 23.

MORE DETAILED DESCRIPTION

Figure 1:
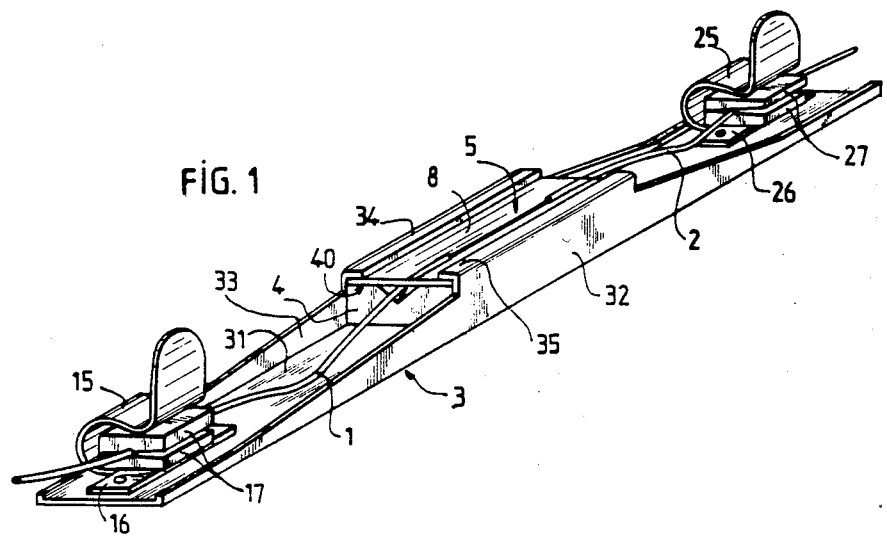
FIG. 1 is a perspective view of apparatus in accordance with the invention for making a single fiber connection, however, the apparatus shown can be used as a building block in a modular multi-fiber system, i.e. for interconnecting two sets of optical fibers.

Optical fiber technology makes frequent use of shapes. In this respect the accompanying drawings are considered to constitute an integral part of the present description for contributing wherever necessary to the definition of the invention and to the sufficiency of the description thereof.

In the figures, reference numeral 1 designates a first optical fiber and reference numeral 2 designates a second optical fiber. Their ends which have been prepared by stripping off a covering are designated 11 and 21 respectively. In most cases the point of contact between the two ends is not shown.

As indicated above, the ends of two optical fibers are initially prepared by stripping off a portion of covering, and by preparing end faces for connection, which faces are plane, perpendicular to the fiber axes, and have a shiny mirror type of surface. The person skilled in the art can be considered to know how to strip off the covering from an optical fiber. End faces which are plane, perpendicular, and have a shiny mirror type surface can be obtained advantageously by applying the teaching of the above-mentioned French patent application No. 78 09703.

The method in accordance with the invention makes use of a frame which bears an overall reference numeral 3. The frame comprises a base 31, having two rising side walls 32 and 33 which retain an optical fiber support generally designated 4 of material which is softer than the fibers and which is elastically deformable. The support 4 has an upper surface 40 in which there is at least one fiber-guiding groove 5.

The groove comprises a central portion 5 between two end portions 61 and 62 of larger cross section. The outside ends of the end portions 61 and 62 are terminated by flared openings 71 and 72. The central portion 5 and the end portions 61 and 62 are geometrically cylindrical or prismatic in shape, i.e. they are of constant cross section, with the central portion having a smaller cross section than the end portions, while the flared openings are frusto conical or pyramidal in shape, and in general have a cross section of the same shape as the adjacent end portion of the groove.

A polished rigid plate 8 is kept bearing against the surface 40 of the support 4. In the embodiment shown in FIG. 1, the polished rigid plate is held in place by inwardly directed hook-shaped flanges 34 and 35 running along the top edges of the side walls 32 and 33 of the frame 3. The support of soft material 4 is thus compressed around four sides by the frame 3 and the rigid plate 8.

Figure 11:
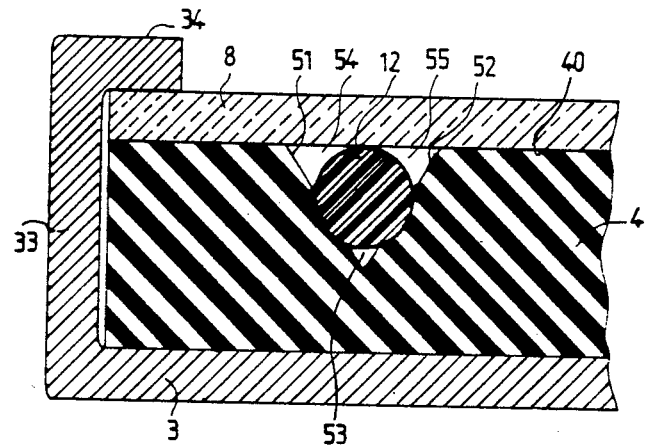
FIG. 11 is a cross section through a fiber as held in a groove showing the co-operation between a block of elastic material and a rigid plate at the end of an optical fiber.

The previously prepared ends 11 and 21 of the two optical fibers 1 and 2 which terminate in end faces 12 and 22 are inserted into opposite ends of the groove 5 and light thrust is maintained on each of them to ensure intimate end-to-end contact of their end faces inside the groove. The fact that the plate 8 bears down on the surface 40 of the support 4 means that the ends of the fibers are subjected to a compressive action which gives rise to an opposing radial reaction on the ends of the fibers by the walls (51, 52) of the groove, thereby aligning the fibers (see FIG. 11).

Figure 3:
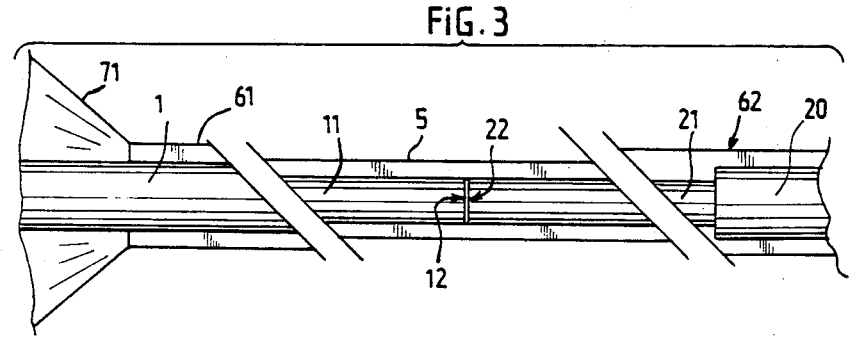
FIG. 3 reproduces portions of FIG. 2 to a larger scale to bring out details of its structure.

The fibers are preferably inserted into the apparatus in sequence. In which case the fibers are connected as follows:

(1) The end face 12 of a first one of the fibers (in this case the fiber 1) is brought to substantially the middle of the groove 5 as shown in FIG. 3.

(2) The fiber 1 is fixed relative to the support. As an example of a suitable means for fixing the fiber, FIG. 1 shows a fiber clamp comprising spring jaws 15 having a base plate 16 fixed to the base 31 of the frame 3 and two jaw plates 17 of soft material which are pressed together by the spring clamp and between which the optical fiber is held.

(3) The end face 22 of the second optical fiber 2 is then moved along the groove 5 to come into contact with the end face 12 of the first optical fiber 1 (see FIG. 3).

(4) The second optical fiber 2 is likewise fixed relative to the support by a second spring clamp 25 which is fixed via its base plate 26 to the other end of the base plate 31 of the frame 3. As before, the clamp uses two jaw plates 27 of soft material for actual clamping contact with the fiber.

It is advantageous to keep the fibers slightly buckled during each of the above steps, thereby ensuring axial thrust on each of the fibers towards the other fiber. A permanent axial thrust can thus be set up which will ensure that intimate contact is maintained over long periods of time between the end faces of the fibers. The slight buckling may be obtained by having clamps 15 and 25 which are slightly off-axis relative to the groove 5, or else by having clamps which are on axis but with slightly too long a portion of fiber between each clamp and the point of contact between the end faces. The position of the clamps may be axially adjustable to ensure a desired degree of buckling.

Figure 10:
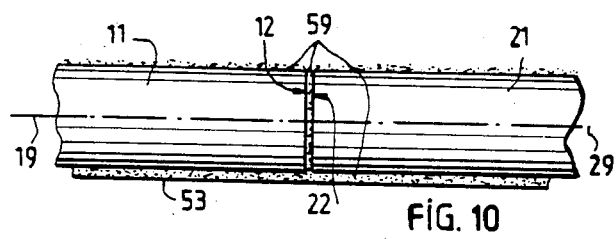
FIG. 10 is a longitudinal section through the ends of two interconnected optical fibers which co-operate with one another via an index-matching liquid.

The groove 5 is preferably filled with index matching liquid before the fibers are inserted therein in order to improve light transmission between the fibers (see FIG. 10). It has been observed, that in addition to this known effect of index matching liquid, the presence of the liquid in the groove also has the effect of automatically cleaning the zone between the end faces 12 and 22 because of the piston effect of inserting the fibers in the groove 5 along axes 19 and 29. Excess liquid is expelled in particular along the bottom notch 53 of the groove, and also along the upper passages 54 and 55 next to the rigid plate 8 (see FIG. 11).

In practice it is useful to apply light to the fibers to be connected. This can be done either via their respective other ends, or else, and preferably, by injecting light through the sides of the fibers through their coverings. The injected light may be pulsed, particularly if it is injected through the sides. This has the effect of causing a point of light to appear at each of the fiber end faces 12 and 22. As the fibers approach each other, the points of light can be seen to get closer together. Intimate end-to-end contact between the end faces 12 and 22 can be considered to have been obtained when the points of light become highly attenuated or practically disappear. This indication of good contact by means of injected light naturally requires the rigid plate 8 to be transparent.

It is indicated above that the fibers have their covering stripped off over an end portion and that their end faces are specially prepared to obtain the good optical characteristics for interconnection. In FIG. 3 the stripped end portions of the fibers are referenced 11 and 21 respectively. These are the portions of the fibers which are inserted in the central portion 5 of the groove.

As a result, an optical fiber connection apparatus is obtained in which a support 4 made of soft, elastically deformable material has a straight groove 5 in at least one surface 40 thereof and suitable for receiving in end-to-end contact the ends 11 and 21 respectively of two optical fibers 1 and 2 to be connected, each of the fibers having an end face 12 or 22 respectively which is perpendicular to the axis of the fiber and which has a shiny mirror type of surface. In accordance with the present invention, the member which keeps the fibers pressed against said surface of the support is a rigid polished plate 8, which applies the said compressive action, with the advantages that result therefrom.

Figure 2:
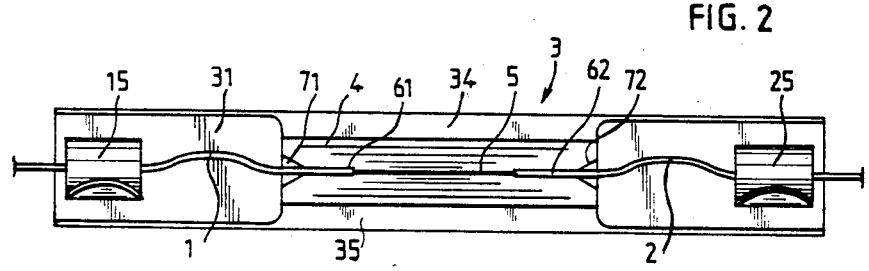
FIG. 2 is a diagrammatic plan view of the apparatus shown in FIG. 1.
Figure 12:
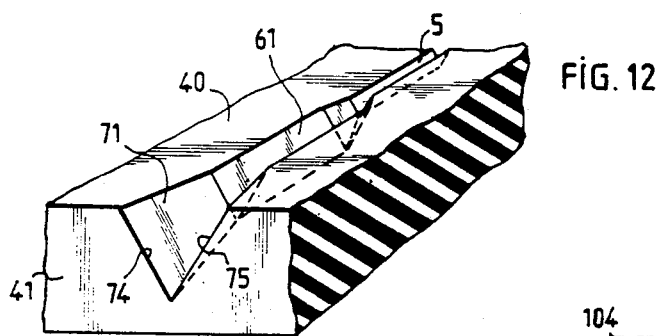
FIG. 12 is a perspective view illustrating a particular shape of composite groove usable in apparatus in accordance with the invention, the groove tapers from an inlet end in order to co-operate with both a stripped end portion of an optical fiber and an adjacent portion which is still in its covering.

It is highly advantageous to have enlarged grooves 61 and 62 at each end of the central portion 5 for receiving optical fiber from which the covering has not been stripped. These enlarged portions 61 and 62 are best seen in FIGS. 2, 3 and 12. Finally, each of the grooves has a flared inlet portion. FIG. 2 shows both flared inlet portions 71 and 72 while FIGS. 3 and 12 shown the inlet portion 71 to a larger scale.

In the embodiment of the invention described above, the support of soft material 4 is made from a single block of material.

The groove 5 per se, i.e. the central portion thereof, may have various shapes.

Figure 4:
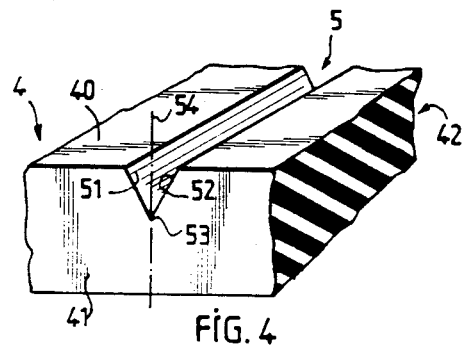
FIGS. 4 to 9 are perspective views showing various different shapes of groove which can be used in the present invention.

FIG. 4 shows a first shape in which the groove 5 has a V-shaped cross section with two sides 51 and 52 and an apex 53. The sides 51 and 52 are symmetrically disposed about an axis 54 which is perpendicular to the surface 40 of the support block. With reference to FIG. 12, it can be seen how such a groove 5 of symmetrical triangular section can run into an adjacent length of groove 61 which is of larger cross section so as to be able to receive a fiber still inside its covering without being too tight a fit. In particular there is a progressive transition from the larger section portion 61 to the smaller section portion 5. Finally the larger groove 61 terminates in a flared portion 71 having sides 74 and 75 which remain symmetrical about a plane perpendicular to the surface 40 and which lead to an end face 41 of the support 4.

Figure 13:
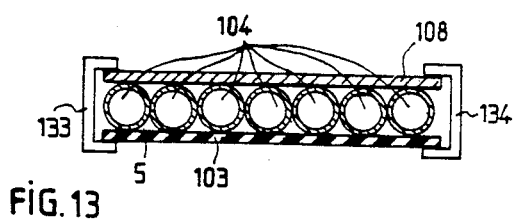
FIG. 13 is a cross section through a variant apparatus in accordance with the invention in which the portion made of soft material is constituted by a plurality of parts.

FIG. 13 shows a variant embodiment of the present invention in which the support of soft material is made up from a plurality of parts. A rigid bottom plate 103 has a plurality of rods of soft material 104 fixed in parallel thereon in mutual contact to define a plurality of grooves 5 between adjacent rods 104. The rods 104 may be glued to the bottom plate 103, for example. A rigid plate of polished glass 108 is pressed against the other side of the rods 104 in such a manner that they are sandwiched between the plates 103 and 108, which are themselves held together by channel section side clamps 133 and 134. The resulting grooves 5 are generally V-shaped, but with curved sides that are convex as seen from inside the grooves. Many other shapes of groove 5 could be produced in this manner by using rods of suitable shapes.

Examples of other shapes of groove are now described with reference to FIGS. 5 to 9. These shapes may be formed in a single block of soft material or else they may be formed by juxtaposing two suitably shaped rods, as shown in FIG. 13.

Figure 5:
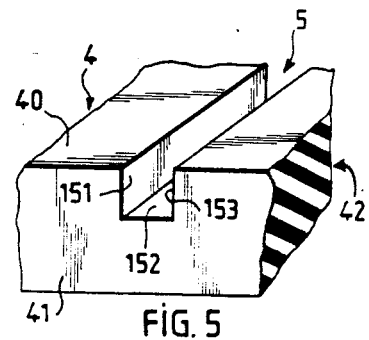

FIG. 5 shows a piece of soft material 4 having a groove of rectangular or square cross section. It has two vertical sides 151 and 153 and a horizontal floor 152.

Figure 6:
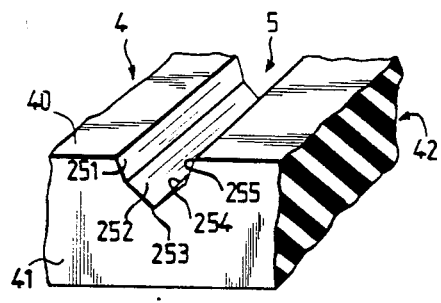

FIG. 6 shows a groove 5 has a cross section which is in four segments 251, 252, 254, and 255. The bottom of the groove is referenced 253.

Figure 9:
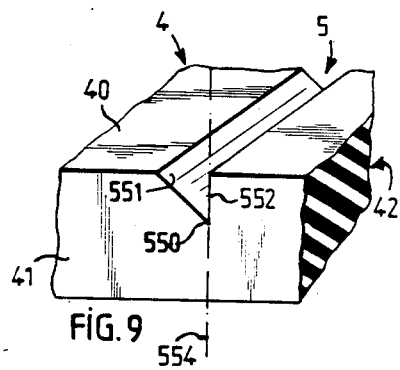

The groove shape shown in FIG. 6 is symmetrical about a plane perpendicular to the surface 40, but asymmetrical shapes are also possible. FIG. 9 shows such a shape. In this embodiment, the groove 5 has a cross section defined by a sloping side 551 and a vertical side 552 with the bottom of the groove being referenced 550. The vertical side 552 coincides with the plane 554 perpendicular to the top surface 40 of the support of soft material 4.

In the remaining shapes that are described below, the groove cross section is defined by one or more curved segments, which may by combined with rectilinear segments.

Figure 7:
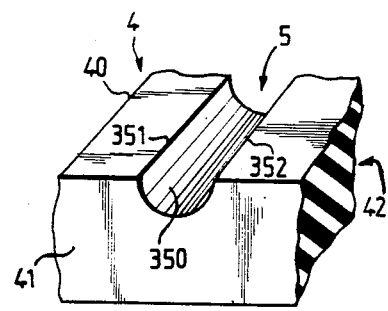

FIG. 7 shows a groove 5 having a semicircular cross section like guttering 350, with the edges of the guttering 351 and 352 meeting the top surface 40 of the support 4.

Figure 8:
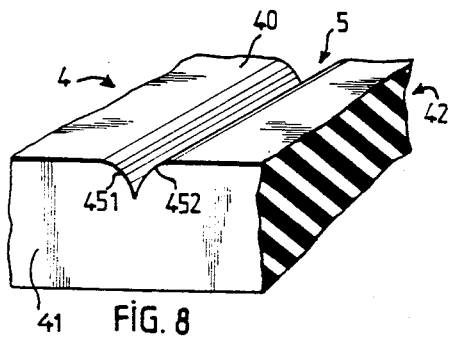

In contrast, FIG. 8 shows a groove 5 of generally V-shaped cross section made up of two quarter circles 451 and 452 meeting at a cusp at the bottom of the groove.

It is recalled that apparatuses described in previously known documents make use of two parts which are both made of soft material and placed on either side of the ends of the fibers to be joined, relying on the elasticity of the two parts to bring the fibers into adequate alignment.

In a manner which is a priori unexpected, it has been observed that the use of a portion of soft material in conjunction with a rigid plate on the other side of the fiber provides sufficient alignment of the fibers to be connected to ensure good optical interconnection between the fibers. Initial tests by the Applicant have shown that attenuation of about one tenth of a decibel is to be obtained at such an interconnection, which thus constitutes an excellent optical connection.

It has been observed that the method and apparatus in accordance with the invention function well even if the fibers to be interconnected are of slightly different diameters, due to manufacturing tolerances for example (such as fibers taken from different batches or from different suppliers). The present invention is also remarkable for its simplicity and for the way it is well adapted to the fragility and small size of the fibers.

In a particular embodiment, the top plate 8 is a plate of glass of suitable thickness to ensure its rigidity. It appears that a thickness of one millimeter is adequate. The support of soft material, or the rods of soft material as the case may be, are molded or machined in a silicone elastomer type of material such as sold under the trademark Silastene by the Rhone-Poulenc company. The frame may be made of metal. Finally, the index matching liquid is preferably a silicone oil such Dow Corning's liquid No. SI 200 (viscosity 50 cp).

A more complex embodiment of the invention is now described with reference to FIGS. 14 and 15.

In this embodiment, the support of soft material is referenced 104 and has a plurality of grooves 105. In order to simplify the drawing, the grooves 105 are shown as being of constant section in FIG. 14, whereas, in practice, they are preferably in the form of a central portion of small section with two end portions of larger section as described above, e.g. with reference to FIG. 12. The support 104 is mounted on a base 103 having lugs 138 and 139 for fixing to an underlying surface (not shown). The ends of the base 103 have upwardly directed risers 132 and 133 which fold over at the top to provide inwardly directed flanges 134 and 135 for holding down a plate of glass 108 pressed against the grooved top surface of the support of soft material 104 as in the above-described embodiment. The uncovered faces of the support block are referenced 141 and 142. In FIG. 14, only one optical fiber connection is shown between fibers 101 and 102 which meet end-to-end in the middle of one of the grooves 105.

Two clamping strips 115 and 125 are disposed on either side of the support block 104, and each of them has its own fixing lugs 116 or 126 for fixing to the same surface (not shown) as the base plate 103 is fixed. The clamping strips have transversal passages for individual fibers in the non-stripped state (only two fibers 101 and 102 are shown). Each fiber is lodged in its own elastomer sleeve (not shown) which is located in a channel 118 and which is held in place by a screw 119. The elastomer serves to prevent microcurves or even breaks in the optical fibers, which would impair light transmission. It can be seen that the two optical fibers shown are slightly buckled as before.

Figure 14:
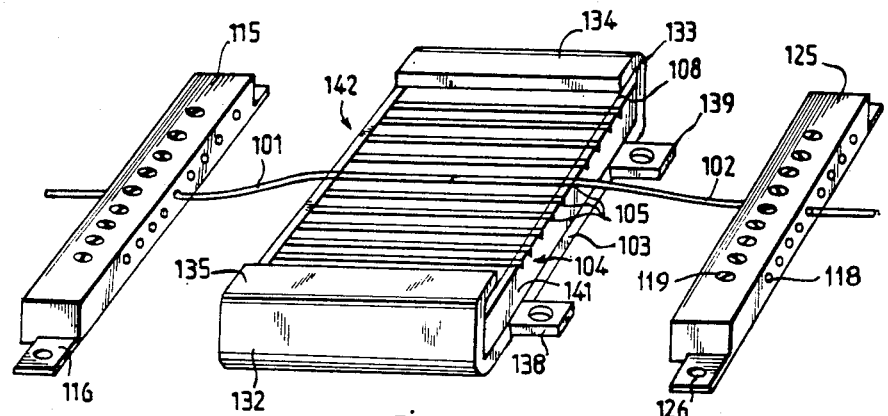
FIG. 14 is a diagrammatic perspective view of a multi-fiber connection apparatus in accordance with the invention.

In spite of only one connection being shown explicitly, it is clear that the apparatus shown in FIG. 14 can be used for interconnecting in pairs a plurality of optical fibers from two different sets of fibers each including ten different fibers.

Figure 15:
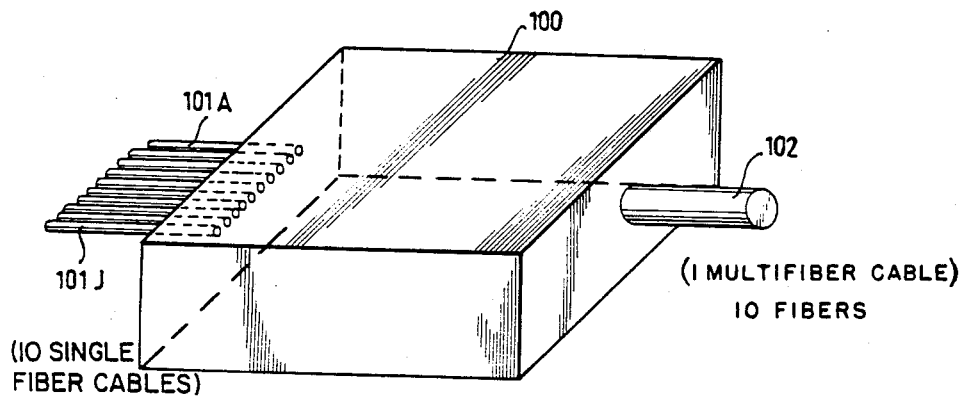
FIG. 15 is a diagrammatic perspective view of the outside of an optical fiber cable interconnection housing enclosing apparatus in accordance with the present invention.

With reference to FIG. 15, a protective housing 100 encloses apparatus of the type shown in FIG. 14. The housing 100 has passages suitable for passing individual optical fibers or for passing an optical fiber cable in sealed manner to the inside of the housing. Although it is possible to interconnect two ten-fiber cables to each other, the housing shown in FIG. 15 represents a slightly different arrangement where ten single fiber cables 101A to 101J enter the housing through one wall, whereas a single ten-fiber cable 102 leaves the housing through an opposite wall.

The fixing lugs 138, 139, 116 and 126 shown in FIG. 14 are naturally fixed to another wall of the housing 100.

Other embodiments of the invention are now described in which either the rigid plate, or the soft support, or both are not plane members. Nonetheless, the various groove cross sections described above can still be freely selected. Likewise, the following features which have already been described in relation to a plane embodiment can still apply:

(1) The optical fibers are caused to buckle slightly on entering the apparatus to ensure suitable end-to-end contact pressure.

(2) Index matching liquid is used, and the same piston effect takes place.

(3) Light can be used as a guide to determining when good contact has been obtained.

(4) The outside member of the apparatus should therefore be transparent over at least a portion of the visible spectrum so that the contact determining points of light can be seen.

(5) Each multi-fiber apparatus shown could readily be adapted to single fiber connection where required.

Finally, it is assumed that the pairs of fiber ends to be interconnected have been suitably prepared to obtain end faces which are plane, perpendicular to the fiber axes, and which have a shiny mirror type of surface. The protective coverings are preferably stripped off over a suitable length.

FIG. 16 shows a rigid member 208 in the form of a cylindrical glass tube having a cross section which is in the form of a circular ring. A support of soft material 204 is a push fit inside the glass tube 208. The periphery of the support has eight equi-spaced grooves such that the periphery of the support member 204 constitutes the groove-carrying surface 240. Only one of the grooves is shown in detail. As mentioned above, the apparatus could be made to have only a single groove.

FIG. 17 shows a reciprocal configuration in which the rigid member is in the form of a solid cylinder 308 inside the support 304 which is in the form of a tight-fitting sleeve of soft material disposed around the rigid member. The cross section of the support is a circular ring and it has seven longitudinally extending grooves running along its inside wall. Only one of the grooves is shown in full, and indeed there need only be one such groove. The groove-carrying surface is referenced 340.

Instead of being of truly circular cross section, as shown in FIGS. 16 and 17, the apparatus can be made to have a polygonal cross section, which may be regular or irregular.

FIGS. 18 and 19 show two further embodiments generally equivalent to those of FIGS. 16 and 17 respectively, except that the members are of rectangular cross section. The person skilled in the art will understand that various other shapes can readily be used, for example, the edges of the polygonal shapes could be rounded or chamfered.

In FIG. 18, as in FIG. 16, the rigid member 408 is on the outside. The support of soft material 404 is inside the rigid member and has three grooves running along its upper plane surface (as disposed in the figure). The closed groove-carrying surface is referenced 440 in this case. Three fibers 1A, 1B, and 1C arrive at one end of the apparatus, while three other fibers 2A, 2B, and 2C arrive at the other end. Taking the fibers 1A and 2A by way of example, their ends 11A and 21A meet substantially at the middle of the central groove 5.

Similarly FIG. 19 shows a reciprocal configuration in which the rigid member 508 is inside and is of rectangular cross section. The support 504 of soft material is on the outside and its inside surface 540 (i.e. the surface including all four inside planes of the support 504) includes three longitudinally extending grooves in the top plane thereof.

In the embodiments described above, the touching portions of the rigid polished plate and the groove-carrying surface are geometrically similar, are substantially complementary, and are so dimensioned as to overlap slightly when at rest. In other words the inside member is slightly larger than the bore of the outside member in which it is to be received. The members are thus a tight or a push fit and force must be exerted to insert one inside the other. The resulting radial pressure between the members when assembled ensures that suitable radial pressure is exerted on the ends of the optical fibers when received in the grooves, thus pressing them against the rigid member and hence ensuring their alignment.

More generally, the groove-carrying surface and the polished surface of the rigid member may be any two homologous or tangential surfaces suitable for exerting the required mutual pressure on each other by co-operation between their respective shapes. Two further suitable examples are shown in FIGS. 20 and 21 where the apparatus is shown in cross section. In both of these cases the rigid member is on the outside. It is referenced 608 in FIG. 20 and 708 in FIG. 21. In both cases it is in the form of a rigid sleeve of circular cross section. Inside there is a support of soft material made up from a plurality of parts. In FIG. 20 these parts comprise three rods of equal diameter (at least in the middle of the apparatus adjacent the grooves 5). The outside contour defined by the set of three rods 604A to 604C defines the groove-carrying surface 640. Thus three grooves are defined between adjacent rods and the inside surface of the rigid tube. Three optical fiber ends 11A to 11C are shown lodged in the grooves.

FIG. 21 shows a similar configuration, except that the support of soft material comprises six rods of equal diameter regularly placed around a seventh, central rod. The six outer rods are referenced 704A to 704F, and the central rod is referenced 704G. The outer periphery of the rods defines a groove-carrying surface 740 having six grooves in which six fiber ends 11A to 11F are lodged.

When the rigid member is on the outside, it is preferably made of glass or other transparent rigid material. The soft support or the soft support rods are molded or machined in a silicone type of elastomer such as Silastene as sold by the Rhone-Poulenc company.

When it is on the inside, the rigid member can still be made of glass, but it could alternatively be made of any other rigid material, metal or otherwise. When the soft groove support material is on the outside, it may be made of one of the above-mentioned elastomers, or if any other suitable synthetic material of comparable mechanical properties which is also transparent in at least a portion of the visible spectrum in order to facilitate checking that the ends of the fibers are indeed in contact.

In order to facilitate making connections and checking connections in accordance with the invention, it is advantageous to improve the visibility of the optical fibers through the plate or tube of glass. It has been observed that the desired result can be obtained by coloring the last few centimeters of the fibers very slightly by means of a felt-tip marker pen such as Onyx Marker (Registered Trade Mark). The deposit of ink on the fiber is thus very thin, strongly adherent, highly visible, and has no effect on fiber centering. The plane end faces are preferably cleaved after the ends of the fibers have been marked with ink.

FIGS. 22 and 23 show an improved version of the apparatus shown in FIGS. 1 and 2.

The improvement relates essentially to the manner in which the optical fibers are clamped beyond the ends of the groove.

At each end of the base plate 31 of the supporting frame 3 there are two upstanding clips 201 and 202 having hook means near to their tops. A block of soft material 217 such as elastomer bears axially against the clips 201 and 202. The material should be one which adheres better to the optical fibers than does the material of the groove 5.

The end of the optical fiber 1 is passed through a protective sleeve 210, and its stripped end portion is inserted into the groove until is comes nearly into contact with the end of the other optical fiber (which is supposed to have been previously inserted and clamped by the clamp 225 at the other end of the apparatus). There is no need at this stage to ensure intimate contact between the end faces of the two optical fibers.

The protective sleeve 210 is placed so that only about half the length of the elastomer block 217 is in contact with the optical fiber 1.

A cover 215 is pivoted to the sides of the frame 3. At its end distant from the pivot, the cover 215 houses a second elastomer block 218 similar to the block 217. The end of the cover has a tab 219 which projects axially between the clips 210 and 202 when the cover is closed, which clips then engage the cover to keep it closed.

In a completely unexpected manner it has been observed that when the elastomer blocks 217 and 218 are pressed against each other, the optical fiber 1 is automatically urged into the groove 5 so as to come into contact with the fiber 2 which is already there.

This particularly simple arrangement leads to very safe and reliable optical fiber interconnection.

The half way position of the protective sleeve 210 seems to contribute to obtaining the axial thrust towards the groove 5. However, experiments have been performed in the absence of a sleeve. The optical fiber is still urged towards the groove 5, but in a less marked manner. The applicant is currently of the opinion that what is happening is this: The end of the block 217 bears against the clips 201 and 202. When the matching block 218 presses down on the block 217 the blocks are compressed. The only direction in which the block 217 is free to expand is towards the groove 5. Thus it expands in that direction taking the optical fiber with it. When a sleeve 210 is used, it appears to be unnecessary for the block 217 to bear against the clips 210 and 202.

Finally, it appears that the optical fiber 1 does not need to be slightly buckled between the point where it leaves the blocks 217 and 218 and the point where it enters the support 4.

Although the index matching medium is highly advantageous for ensuring good light transmission, there are some applications for which it may be omitted.

I claim:

1. A method of connecting optical fibers, the method including a preparatory step of:
   (a) preparing the ends of at least two optical fibers for connection;
   and comprising the improvement of the following steps including:
   (b) inserting the ends of at least two fibers to be connected end-to-end in a groove provided in the surface of a support which, at least at said surface, is made of a material that is softer than the fibers and which is elastically deformable; lightly urging the fibers against one another to ensure intimate contact between their end faces; and, at the same time, maintaining a polished rigid alignment member bearing against said support surface and in line contact with said fibers thereby applying pressure to said fibers giving rise to radial reaction from the wall of the groove against the fibers and thus ensuring that the fibers are retained in line contact with and in alignment against said rigid alignment member.

2. A method according to claim 1, wherein step (b) is performed as follows:
   (b1) the end face of a first one of the fibers is brought to substantially half way along the groove;
   (b2) the first fiber is fixed relative to the support;
   (b3) the end face of the second fiber is brought into contact inside the groove with the end face of the first fiber; and (b4) the second fiber is also fixed relative to the support, at the opposite end thereof.

3. A method according to claim 2, wherein each of the fixing steps b2 and b4 includes axially urging the fibers towards each other, thereby maintaining close end-to-end contact between the fibers over a period of time by virtue of the permanent axial force thus exerted.

4. A method according to claim 1, wherein the groove is initially filled with an index matching liquid, thereby not only improving light transmission between the fibers, but also automatically cleaning the zone between the two fiber end faces by virtue of the piston effect exerted by said end faces as the fibers are moved along the groove while being inserted therein.

5. A method according to claim 1, wherein said rigid member is transparent, and the fibers viewed therethrough as the fibers are urged against one another.

6. A method according to claim 5, wherein step b further includes applying light radiation to the two fibers to be connected, causing a point of light to appear at each fiber end face, said end faces being considered to be in intimate contact when said points of light are attenuated or practically disappear.

7. A method according to claim 5, wherein the sides of the prepared end portions of the fibers are colored.

8. Apparatus for connecting optical fibers, the apparatus comprising firstly a support having at least one surface which is made of soft, elastically deformable material and which includes a groove with a groove defined wall in said surface suitable for receiving the ends of two optical fibers to be connected in end-to-end contact, and secondly a member which is kept bearing against the support surface and the groove-received ends of the optical fibers, the improvement wherein said member is rigid and comprises a polished bearing surface bearing against the said support surface and exerting a compression action on the said groove-received ends of the fibers, giving rise to radial reaction from the wall of the groove against the ends of the fibers, said bearing surface defining a rigid alignment surface against which the fibers are elastically pressed, thus ensuring that the fibers are aligned.

9. Apparatus according to claim 8, wherein said support of soft material is mounted on a rigid frame, and wherein the frame includes hook-shaped members placed to hold said rigid member pressed against the soft support against the elastic reaction thereof, thereby keeping the rigid member bearing against said support surface.

10. Apparatus according to claim 8, wherein the support of soft material is in the form of a block.

11. Apparatus according to claim 8, wherein the support of soft material comprises a plurality of adjacent parts.

12. Apparatus according to claim 8, wherein said rigid member is a transparent plate.

13. Apparatus according to claim 12, wherein said transparent plate is made of glass.

14. Apparatus according to claim 8, including clamp means on opposed sides of the support for fixing the fibers relative to the support and for urging the fibers towards each other to provide permanent axial thrust on the fibers and ensure that close contact is maintained over time between the end faces of the fibers in the groove.

15. Apparatus according to claim 8, wherein said groove has a cross section made up of a plurality of line segments.

16. Apparatus according to claim 15, wherein said groove has a V-shaped cross section.

17. Apparatus according to claim 8, wherein said groove has a cross section made up of at least one curved line segment.

18. Apparatus according to claim 8, wherein said groove is symmetrical about a plane perpendicular to said surface of soft material.

19. Apparatus according to claim 8, wherein each end of said groove includes a portion of greater cross section suitable for receiving an optical fiber inside its covering.

20. Apparatus according to claim 8, wherein each end of said groove is flared.

21. Apparatus according to claim 8, including a plurality of rectilinear grooves having substantially parallel axes, thereby enabling a plurality of optical fibers belonging to two different sets of fibers to be interconnected end-to-end in pairs.

22. Apparatus for connecting optical fibers comprising firstly a support which is made of soft, elastically deformable material and which has a groove-carrying surface having at least one groove defined by a groove wall and suitable for receiving the ends of two optical fibers to be connected in end-to-end contact, and secondly a rigid member having a polished surface adapted to bear against the groove-carrying surface and the ends of the optical fibers, in tangential line contact with the fibers, giving rise to radial reaction from the wall of each groove against the ends of the fibers, thus ensuring that the fibers are aligned against the rigid member, the polished surface of the rigid member being curved about the axis of the groove or grooves.

23. Apparatus according to claim 22, wherein the polished surface of the rigid member has a closed cross section.

24. Apparatus according to claim 23, wherein the polished surface of the rigid member has a circular or substantially circular cross section.

25. Apparatus according to claim 23, wherein the polished surface of the rigid member has a polygonal or substantially polygonal cross section.

26. Apparatus according to claim 22, wherein the polished surface of the rigid member and the groove-carrying surface are two geometrically similar surfaces, which are quasi complementary and which overlap slightly in the rest position such that placing one against the other requires thrust to be exerted.

27. Apparatus according to claim 22, wherein the groove-carrying surface and the polished surface of the rigid member are a pair of homologous and/or tangential surfaces suitable for exerting said bearing force against one another by cooperation of their respective shapes.

28. Apparatus according to claim 22, wherein the elastically deformable material is made from a plurality of parts such that its outer contour or envelope defines the groove-carrying surface.

29. Apparatus according to claim 22, wherein the rigid member surrounds the support.

30. Apparatus according to claim 22, wherein the support with the groove-carrying surface surrounds the rigid member.

31. Apparatus according to claim 22, wherein one of said support and said rigid member is at least partially transparent.

32. Apparatus according to claim 22, wherein the rigid member is made of glass.

33. Apparatus for connecting optical fibers, the apparatus comprising firstly a support having at least one surface which is made of soft, elastically deformable material and which includes a groove with a groove defined wall in said surface suitable for receiving the ends of two optical fibers to be connected in end-to-end contact, and secondly a member which is kept bearing against the support surface and the groove-received ends of the optical fibers; the improvement wherein said member is rigid and comprises a polished bearing surface bearing against the said support surface and exerting a compression action on the said groove-received ends of the fibers, giving rise to radial reaction from the wall of the groove against the ends of the fibers, thus ensuring that the fibers are aligned, said apparatus including two clamps on opposed sides of the support for fixing the fibers relative to the support in a manner to ensure the fibers are urged towards each other to provide permanent axial thrust on the fibers and ensure that close contact is maintained over time between the end faces of the fibers in the groove, each clamp comprising a block of soft material aligned with and longitudinally outward of said support surface groove, a stop outward of said block relative to said groove, said block of soft material, to the opposite side from said support, abutting axially against said stop, each clamp further comprising a hinged closure member including a second block of similar soft material which bears against the first-mentioned block in such a manner as to urge a fiber running between said blocks towards the groove in the support.

34. Apparatus according to claim 33, wherein the portion of fiber running between said clamp blocks is partially lodged in a protective tube or sleeve.

* * * * *